United States Patent [19]

Yoshida

[11] Patent Number: 5,489,323
[45] Date of Patent: Feb. 6, 1996

[54] GROWTH PROMOTER FOR AQUATIC PLANT AND METHOD FOR APPLICATION THEREOF

[75] Inventor: Nobuyuki Yoshida, Tokyo, Japan

[73] Assignee: Japan Pet Drugs Co., Ltd., Tokyo, Japan

[21] Appl. No.: 223,999

[22] Filed: Apr. 6, 1994

[30] Foreign Application Priority Data

Dec. 29, 1993 [JP] Japan ................................. 5-353778

[51] Int. Cl.$^6$ ................................................. C05B 7/00
[52] U.S. Cl. ...................... 71/34; 71/63; 47/1.4; 47/59; 119/231
[58] Field of Search .................. 71/34, 64.07, 64.11, 71/63; 47/1.4, 58, 59; 119/231

[56] References Cited

U.S. PATENT DOCUMENTS

| | | | |
|---|---|---|---|
| 3,059,379 | 10/1962 | Attoe | 47/485 |
| 3,197,302 | 7/1965 | MacBride | 71/37 |
| 4,074,997 | 2/1978 | Cohen | 71/24 |
| 4,326,525 | 4/1982 | Swonson et al. | 128/260 |
| 5,146,870 | 9/1992 | Eyas | 119/5 |

FOREIGN PATENT DOCUMENTS 3215958  11/1983  Germany.

OTHER PUBLICATIONS

Yokoyama, Database WPI, Section Ch. Week 8705, Derwent Publications Ltd., London, GB AN87–033973 JP–A–61 291 482 22 Dec. 1986.

Aba KK, Database WPI, Section Ch, Week 9036, Derwent Publications Ltd., London, GB AN90–272053 JP–A–02 192 485 30 Jul., 1990.

*Primary Examiner*—Ferris Lander
*Attorney, Agent, or Firm*—Wenderoth, Lind & Ponack

[57] ABSTRACT

A growth promoter for aquatic plants, which increases the carbonate concentration in water to promote the growth of aquatic plants and contains phosphate as an active component, and a method for applying said growth promoter, which comprises placing an aqueous solution or dispersion of the growth promoter in a container of which one end is narrowly opened and placing the container in water in a water tank thereby to allow the growth promoter to ooze through the narrowly opened end.

2 Claims, No Drawings

GROWTH PROMOTER FOR AQUATIC PLANT AND METHOD FOR APPLICATION THEREOF

FIELD OF THE INVENTION

The present invention relates to a growth promoter for aquatic plants and a method for the application thereof. More specifically, it relates to a growth promoter for aquatic plants which increases the carbonate ion concentration in a water tank with aquatic plants therein (e.g., a fish tank or aquarium) up to a concentration suitable for the growth promotion of the aquatic plants thereby to activate the photosynthesis of the aquatic plants, and a method for the application thereof.

PRIOR ART OF THE INVENTION

It is known that the optimum carbonate ion concentration for the growth of aquatic plants is 15–16 ppm. However, tap water, underground water, etc., generally have a carbonate ion concentration of 4 to 6 ppm. It is hence effective for the promotion of the growth of aquatic plants to increase the carbonate ion concentration in water. For increasing the carbonate ion concentration, there is known a method in which carbonic acid gas is gradually introduced into water from a container filled with carbonic acid gas. The problem with this method is that an additional equipment such as the above container is required and that the handling of such equipment is complicated. Another problem with the above method is that since carbonic acid gas rapidly floats upwardly in water, the effect on the growth of aquatic plants is not so sufficient as expected from the introduced carbonic acid gas. When the equipment is handled carelessly, carbonic acid gas may be released at once to alter the aquatic environment, and as a result, fishes kept together with aquatic plants may be harmed.

SUMMARY OF THE INVENTION

It is an object of the present invention to provide a growth promoter for aquatic plants, which increases the carbonate ion concentration in water in a water tank thereby to promote the growth of aquatic plants, and a method for the application thereof.

According to the present invention, there is provided a growth promoter for aquatic plants, which contains phosphate as an active component.

According to the present invention, further, there is also provided a method for applying a growth promoter for aquatic plants, which comprises placing an aqueous solution or dispersion of phosphate in a container of which one end is narrowly opened and placing the container in water in a water tank thereby to allow aqueous solution of phosphate to ooze through the narrowly opened end.

DETAILED DESCRIPTION OF THE INVENTION

The phosphate used in the present invention includes primary salt of orthophosphoric acid ($M^1H_2PO_4$), secondary salt of orthophosphoric acid ($M^1_2HPO_4$), tertiary salt of orthophosphoric acid ($M^1_3PO_4$), polyphosphate ($M^1_{n+1}P_nO_{3n+1}$), metaphosphate (($M^1PO_3)_n$), pyrophosphate acid salt ($M^1_2H_2P_3O_7$), orthopyrophosphate ($M^1_4P_2O_6$) primary salt of phosphorous acid ($M^1H_2PO_3$) and secondary salt of phosphorous acid ($M^1H_2PO_3$). In the above chemical formulae, $M^1$ refers to alkali metal such as sodium or potassium, or ammonium.

Carbonate ion dissolved in water forms carbonate or bicarbonate with metal ion included in the water. The metal ion includes alkali metal ion and alkaline earth metal ion. In the present invention, carbonate is brought into a state where carbonate ion can be easily released by chelating alkaline earth metal ion with phosphate, i.e., masking alkaline earth metal ion of carbonate or bicarbonate. The phosphate used in the present invention includes a phosphate which forms a sparingly soluble salt with alkaline earth metal to mask the alkaline earth metal and a phosphate which forms a water-soluble complex with alkaline earth metal to mask the alkaline earth metal. In view of the appearance of a water tank, it is preferred to use a phosphate which forms a water-soluble complex. The phosphate which forms a water-soluble complex includes polyphosphate, metaphosphate and pyrophosphate. However, a phosphate which forms a sparingly soluble salt may be used together with the phosphate which forms a water-soluble complex, since, in this case, the amount of a precipitate is small. The phosphate which forms a sparingly soluble salt includes primary, secondary and tertiary salts of orthophosphoric acid.

Calcium or magnesium which forms carbonate or bicarbonate as a metal ion is a hardness component and contained in water. Further, when living things such as plants, fishes, etc., are present, calcium and magnesium are also contained in their foods and excretions. The metal ion is present as a carbonate hardness component or a non-carbonate hardness component. The non-carbonate hardness component is present in the form of sulfate or chloride. Since a large amount of carbonic acid gas in air is dissolved, the carbonate hardness component is present in larger amount.

The chelating effect of the phosphate on the carbonate hardness component is as follows when the phosphate is a tertiary salt of orthophosphoric acid.

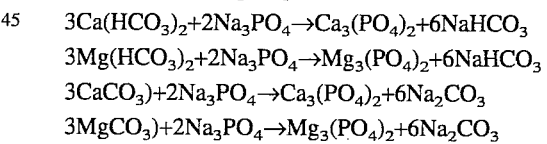

Carbonate, sulfate, nitrate and chloride of calcium or magnesium are sparingly soluble, and are present as permanent hardness components, while sodium salts of carbonic acid or bicarbonic acid are water-soluble, and are present as free carbonates.

The present invention seeks to convert carbonate and bicarbonate present as permanent hardness component to phosphates and use formed carbonate ion and bicarbonate ion as a source for a carbonate component for the promotion of growth of aquatic plants.

In free carbonates in water, carbonate ion and bicarbonate ion maintain a quantitative equilibrium state depending upon pH. When carbonate ion is absorbed into plants, bicarbonate ion is converted to carbonate ion. When carbonate ion and bicarbonate ion are in an equilibrium state, and when the pH is 6.5 or less, the amount of carbonate ion is larger than the amount of bicarbonate ion. In the case of freshwater aquarium fish, the optimum pH for aquarium fish is about 6.8. For maintaining a pit around the pH of 6.8, a plurality of kinds of phosphates may be used in combination to impart the growth promoter with the pH buffer capability.

The present invention provides a method for applying a growth promoter for aquatic plants, which comprises placing an aqueous solution of phosphate in a container having at least one narrow opening, and placing the container in water in a water tank thereby to allow aqueous solution of phosphate to ooze through the narrow opening.

The form of the above "container" is not specially limited, while it is preferred to use a container having a proper volume, having the form of, or a form similar to the form of, for example, an ampoule to be filled with an injection solution, and having at least one narrow opening. The container may have at least one narrow opening in any place on the container. Further, ond one end of the container may be narrowly opened.

The growth promoter is placed in the above container, and the growth promoter is allowed to ooze through the narrow opening. This container may be horizontally, vertically or obliquely positioned in a water tank, since the growth promoter easily oozes through the narrow opening due to a difference between the concentration within the container and the concentration outside the container. For allowing the growth promoter to ooze easily, it is preferred to position the container in a water tank such that the narrow opening faces downward. The container may contain not only the growth promoter but also a water-soluble or water-dispersible fertilizer.

According to the present invention, there is provided a growth promoter for aquatic plants, which chelates sparingly soluble carbonate in water to convert it into advantageous carbonate, which carbonate can be used for the promotion of growth of aquatic plants.

According to the present invention, further, there is also provided a method for gradually releasing the growth promoter into water, whereby the change of an environment in water proceeds only gradually, and fishes such as aquarium fishes which are often kept together with aquatic plants are not harmed.

The present invention will be detailed hereinafter with reference to Examples, in which "%" stands for "% by weight" unless otherwise specified.

EXAMPLE 1

Three water tanks having a size of 60×36×30 cm were filled with 55 liters of water each, and the following test conditions were set.

Plot A: A container containing 30 ml of an aqueous solution containing 3% of primary potassium phosphate, 6% of secondary sodium phosphate and 10% of sodium metaphosphate was placed in a first one of the water tanks such that the narrowly opened end of the container faced downward.

Plot B: 400 Milliliters of a carbonic acid gas was dissolved in the water in a second one of the tanks once a day by releasing the carbonic acid gas into a cylindrical diffuser having a diameter of 6 cm and a height of 17 cm, which had an opening facing downward. The dissolved carbonate was gradually diffused through the lower portion of the diffuser into water in the water tank. The releasing of carbonic acid gas was carried out at 9:30 am every day. The water in each tank was measured for pH at 4:30 pm every day.

Plot C: A third one of the tanks was filled with water alone.

The temperature of the water in each plot was set at 25° to 28° C., and as aquatic plants, 10 pieces of *Cabomba caroliniana* having a height of approximately 15 to 20 cm and 10 pieces of *Ludwigis repens* having a height of approximately 10 to 12 cm were placed in each tank. The water in each tank was filtered through an air-lift filter, and exposed to two 20 W fluorescent lamps for plant growth for 10 hours per day. The water in each tank was measured for a dissolved carbonate concentration, a pH and a total hardness. Table 1 shows the results. In each plot, for evaluating the growth degrees of the aquatic plants, the aquatic plants were measured for heights excluding the lengths of their root portions 14 days after the test was initiated. Table 2 shows the results, in which figures show the numbers of the aquatic plants having the heights as shown in a left column.

TABLE 1

| | 0 | 1 | 2 | 3 | 4 | 5 | 6 | 7 | 8 | 9 | 10 | 11 | 12 | 13 | 14 | (days) |
|---|---|---|---|---|---|---|---|---|---|---|---|---|---|---|---|---|
| Plot A | | | | | | | | | | | | | | | | |
| pH | 7.8 | 7.3 | 7.5 | 7.6 | 7.6 | 7.6 | 7.7 | 7.6 | 7.6 | 7.5 | 7.5 | 7.6 | 7.6 | 7.5 | 7.5 | |
| Dissolved carbonate concentration | 4 | 18 | 18 | 18 | 18 | 18 | 16 | 16 | 16 | 16 | 16 | 16 | 16 | 16 | 16 | |
| Total hardness | 75 | 65 | 65 | 65 | 65 | 65 | 65 | 65 | 65 | 65 | 65 | 65 | 65 | 65 | 65 | |
| Plot B | | | | | | | | | | | | | | | | |
| pH | 7.8 | 7.4 | 7.5 | 7.6 | 7.5 | 7.4 | 7.3 | 7.5 | 7.7 | 7.7 | 7.8 | 7.9 | 8.1 | 8.0 | 8.0 | |
| Dissolved carbonate concentration | 4 | 6 | 6 | 6 | 6 | 6 | 6 | 6 | 6 | 6 | 6 | 6 | 6 | 6 | 6 | |
| Total hardness | 75 | 70 | 70 | 70 | 70 | 70 | 70 | 70 | 70 | 70 | 70 | 70 | 70 | 70 | 70 | |
| Plot C | | | | | | | | | | | | | | | | |
| pH | 7.8 | 7.8 | 7.8 | 8.1 | 8.1 | 7.8 | 7.8 | 8.0 | 7.9 | 7.9 | 8.0 | 8.1 | 8.0 | 7.9 | 7.9 | |
| Dissolved carbonate concentration | 4 | 4 | 4 | 4 | 4 | 4 | 4 | 4 | 4 | 4 | 4 | 4 | 4 | 4 | 4 | |
| Total hardness | 75 | 74 | 74 | 75 | 75 | 75 | 75 | 75 | 75 | 75 | 75 | 75 | 75 | 75 | 75 | |

Notes:
Unit of dissolved carbonate concentration: ppm
Unit of total hardness: ppm

TABLE 2

| | Height of *Cabomba caroliniana* (cm) | | |
|---|---|---|---|
| | Plot A | Plot B | Plot C |
| 15–20 cm | 0 | 1 | 5 |
| 21–25 cm | 3 | 8 | 5 |
| 26–30 cm | 7 | 1 | 0 |

| | Height of *Ludwigis repens* (cm) | | |
|---|---|---|---|
| | Plot A | Plot B | Plot C |
| 10–12 cm | 0 | 2 | 1 |
| 13–15 cm | 6 | 5 | 8 |
| 16–18 cm | 4 | 3 | 1 |

In the plot A in which the growth promoter of the present invention was added, the pH was relatively stable for 14 days in a state in which the pH was decreased. Further, the total hardness was also stable for 14 days in a state in which it was lower than that found before the growth promoter was added. Furthermore, the dissolved carbonate concentration was stable for 14 days, i.e., it was 16 to 18 ppm. Moreover, as compared with the other plots, the remarkable growth of the aquatic plants was observed in the plot A. When the water quality changes such as a change in the pH were measured every hour, the water quality changed only gradually, which has shown that the environmental influence of the growth promoter on fish can be minimized.

EXAMPLE 2

Changes in water quality were studied in the same manner as in Example 1 except that the amounts of phosphates added to plots were changed as shown below (plots D and E).

| | Plot D | Plot E |
|---|---|---|
| Sodium metaphosphate | 3% | 10% |
| Secondary sodium phosphate | 6% | 9% |
| Primary potassium phosphate | 10% | 0% |

Further, a carbonic acid gas was introduced in the same manner as in Example 1 (plot F), and a tank was filled with water alone (plot G).

TABLE 3

| | 0 | 1 | 2 | 3 | 4 | 5 | 6 | 7 | 8 | 9 | 10 | 11 | 12 | 13 | 14 | (days) |
|---|---|---|---|---|---|---|---|---|---|---|---|---|---|---|---|---|
| Plot D | | | | | | | | | | | | | | | | |
| pH | 8.1 | 7.4 | 7.6 | 7.8 | 7.7 | 7.6 | 7.8 | 7.8 | 7.7 | 7.7 | 7.7 | 7.7 | 7.8 | 7.7 | 7.7 | |
| Dissolved carbonate concentration | 4 | 16 | 16 | 14 | 14 | 14 | 14 | 12 | 12 | 12 | 12 | 12 | 12 | 12 | 12 | |
| Total hardness | 80 | 70 | 70 | 70 | 70 | 75 | 75 | 75 | 75 | 75 | 75 | 75 | 75 | 75 | 75 | |
| Plot E | | | | | | | | | | | | | | | | |
| pH | 8.1 | 7.5 | 7.7 | 7.9 | 7.9 | 7.8 | 8.0 | 7.9 | 7.8 | 7.8 | 7.9 | 7.8 | 7.9 | 7.8 | 7.8 | |
| Dissolved carbonate concentration | 4 | 10 | 10 | 8 | 8 | 8 | 8 | 8 | 8 | 8 | 8 | 8 | 8 | 8 | 8 | |
| Total hardness | 80 | 70 | 70 | 70 | 70 | 75 | 75 | 75 | 75 | 75 | 75 | 75 | 75 | 75 | 75 | |
| Plot F | | | | | | | | | | | | | | | | |
| pH | 8.1 | 8.0 | 7.8 | 7.9 | 7.8 | 8.0 | 7.9 | 7.9 | 8.0 | 7.9 | 7.8 | 7.9 | 7.7 | 7.9 | 7.9 | |
| Dissolved carbonate concentration | 4 | 6 | 6 | 6 | 6 | 6 | 6 | 6 | 6 | 6 | 6 | 6 | 6 | 6 | 6 | |
| Total hardness | 80 | 80 | 80 | 80 | 80 | 80 | 80 | 80 | 80 | 80 | 80 | 80 | 80 | 80 | 80 | |
| Plot G | | | | | | | | | | | | | | | | |
| pH | 8.1 | 8.0 | 8.0 | 8.1 | 8.2 | 8.2 | 8.2 | 8.1 | 8.1 | 8.1 | 8.2 | 8.2 | 8.1 | 8.0 | 8.1 | |
| Dissolved carbonate concentration | 4 | 4 | 4 | 2 | 2 | 2 | 2 | 2 | 2 | 2 | 2 | 2 | 2 | 2 | 2 | |
| Total hardness | 80 | 80 | 80 | 80 | 80 | 80 | 80 | 80 | 80 | 80 | 80 | 80 | 80 | 80 | 80 | |

Notes:
Unit of dissolved carbonate concentration: ppm
Unit of total hardness: ppm In each of the plots D and E, the dissolved carbonate concentration was nearly between 8 and 16 ppm, and the carbonate concentration was maintained in the range suitable for growing aquatic plants.

What is claimed is:

1. A method for promoting the growth of aquatic plants in a water tank containing water and aquatic plants, which comprises placing in the water tank
   at least one phosphate selected from alkali metal salts and ammonium salts of orthophosphoric acid, and at least one phosphate selected from alkali metal salts and ammonium salts of polyphosphoric, metaphosphoric, pyrophosphoric, orthopyrophosphoric and phosphorous acids, wherein the phosphates are present in amounts effective to promote plant growth in the water tank by converting carbonate and bicarbonate present in the water tank as permanent hardness components, to carbonate and bicarbonate ions for promotion of aquatic plant growth.

2. The method for promoting the growth of aquatic plants according to claim 1, wherein the alkali metal salts are sodium or potassium salts.

* * * * *